Nov. 21, 1961   F. N. WILLIAMS   3,009,679
FAUCET CONSTRUCTION
Filed Sept. 18, 1958
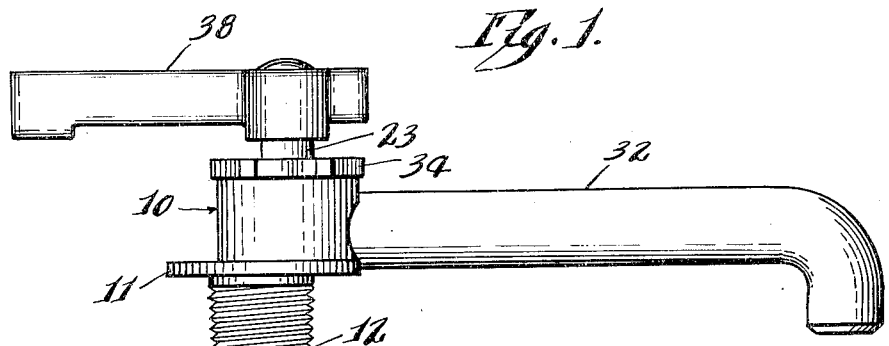
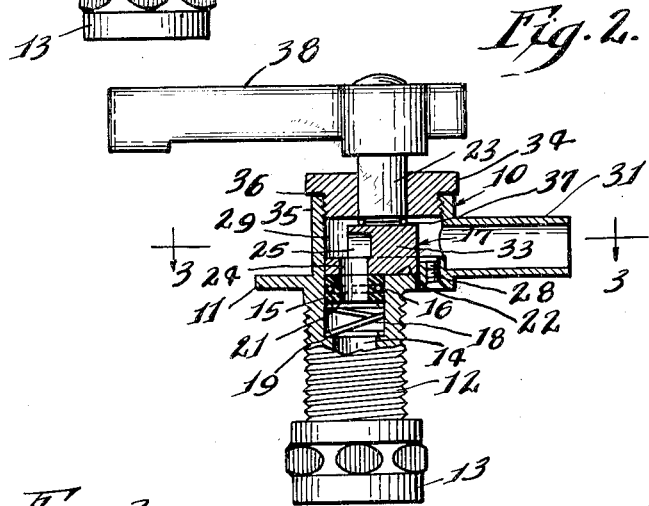
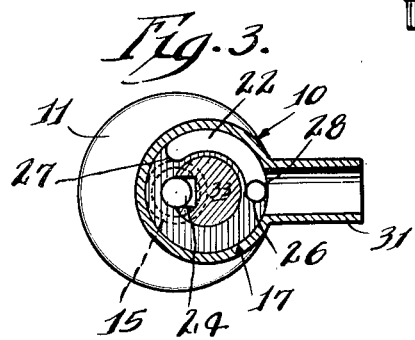
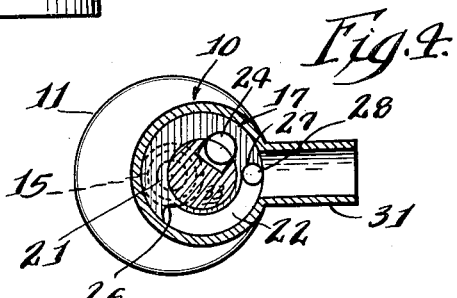
Inventor.
Frank N. Williams.
By Wilson & Geppert
Attorneys.

United States Patent Office 3,009,679
Patented Nov. 21, 1961

3,009,679
FAUCET CONSTRUCTION
Frank N. Williams, Wadsworth, Ill., assignor to Federal-Huber Company, Chicago, Ill., a corporation of Illinois
Filed Sept. 18, 1958, Ser. No. 761,907
4 Claims. (Cl. 251—172)

The present invention relates to a faucet construction and more particularly to a novel valve assembly for a faucet comprising a rotatable valve member and a valve seat so constructed, arranged and operated as to assure effective control of the liquid supply.

Among the objects of the present invention is the provision of a novel valve assembly for a faucet construction consisting of a rotatable valve member and a valve seat maintained in sealing contact with the valve member by the pressure of the entering water when the valve is closed.

The present invention further comprehends the provision of a novel valve member and novel means for controlling operation and limiting rotation thereof.

A further object of the present invention is the provision of a novel valve assembly consisting of a minimum number of parts and in which wear on the component parts is reduced to a minimum.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:
FIGURE 1 is a view in side elevation of the novel faucet assembly.
FIG. 2 is a view, part in side elevation and part in vertical cross section, of the assembly of FIG. 1 but with the nozzle or spout removed and showing the position of the component parts when the handle and valve member are moved to open position.
FIG. 3 is a view in horizontal cross section taken in a plane represented by the line 3—3 of FIG. 2 and viewed in the direction of the arrows.
FIG. 4 is a view similar to FIG. 3 but showing the position of the valve member when moved by the handle to closed position.

Referring more particularly to the disclosure in the drawing in which is shown an illustrative embodiment of the present novel valve unit in a faucet assembly, the present assembly is shown as comprising a valve body 10 provided with an external flange 11 and a depending threaded shank 12 for connection by means of a nut 13 and the flange to a sink or the like (not shown). This shank 12 has an inlet passage 14 therethrough for the entering water, either hot or cold, with this passage opening into a central bore 21 in a valve seat 15 mounted in the passage.

The valve seat 15 is formed as a reversible annular ring of a relatively hard graphite composition fitting conformably in the upper end of the inlet passage 14 and provided on its circumference intermediate its opposite smooth and flat faces with an annular groove or channel opening outwardly and receiving therein an O-ring 16 having wiping and sealing contact with the smooth interior of the passage 14. This valve seat is biased to its elevated, operative position and maintained in contact with the adjacent smooth and flat face of a relatively hard metal valve member 17 by the pressure of the entering water. A relatively light coil or expansion spring 18 seating at its lower or inner end against an annular shoulder 19 in the passage 14 and at its upper or outer end against the lower flange or face of the valve seat 15 spring-biases the valve seat to its elevated position in the event the water pressure is relieved. At other times the water pressure effectively retains the valve seat in sealing contact with the adjacent smooth face of the valve member 17.

The valve seat 15 with its opposite faces similarly contoured, is capable of being reversed in the event its upper or outer face is scored or damaged, and thus its useful life may be substantially increased. This reversible feature also facilitates assembly and replacement of the valve seat.

The entering passage 14 for the water and the port 21 in the valve seat 15 are offset or eccentrically arranged in the smooth, flat base 22 of the cylindrical bore of the valve body 10. The valve member 17, which may be formed integral with the valve stem 23 or separate and affixed thereto, is provided with an offset or eccentric port 24, opening vertically therethrough and outwardly therefrom at 25 into the hollow interior of the valve body, and is relieved or cut away along substantially one-third of its circumference between the arcuate ends 26 and 27 which provide stops to limit the arc of rotation of said valve member with either of said stops adapted to engage an upstanding fixed pin or abutment 28 in the base 22 of the valve body. This pin is shown disposed diametrically opposite to the aligned inlet passage 14 and the port 21 in the valve seat 15 and adjacent the discharge port opening from the annular space 29 in the valve body into a pipe 31 (FIG. 2) encompassed by and discharging into a nozzle or spout 32.

The valve stem 23 formed integral with or rigidly connected with the upper end or collar 33 of the valve member 17, projects through a removable end cap or closure 34 threaded into the upper, internally threaded open end 35 of the valve body 10. A sealing gasket 36 is disposed between the upper or outer end of the valve body and the end cap 34 and an O-ring 37 is carried by the valve stem and has sealing contact between the upper end 33 of the valve member 17 and the underside of the cap 34 to effectively seal against leakage.

On the upper or external end of the valve stem 23 is provided a detachable handle 38 for moving the stem and valve member 17 from its open position shown in FIGS. 1, 2 and 3, to its closed position shown in FIG. 4. In the open position the entering water passes upwardly through the inlet passage 14 and aligned port 21 in the valve seat 15, through the then aligned or registering ports 24 and 25 in the valve member 17 and into the annular space 29 about the upper end 33 of this valve member 17, and then through the nozzle or spout 32 to discharge.

Moving the handle 38, valve stem 23 and valve member 17 in a counterclockwise direction as viewed in FIGS. 3 and 4 from the open position shown in FIG. 3 to that of FIG. 4, the port 24 in the valve member 17 is moved out of registry with the port 21 in the valve seat 15 and the valve is closed. In the two extreme positions shown, in FIG. 3 the handle 38 has been moved whereby the arcuate end 26 of the valve member 17 engages the pin or abutment 28 and the valve member is disposed in fully open position, and in FIG. 4 the arcuate end 27 engages the abutment 28 and the valve member 17 is disposed in closed position. Moving the handle to an intermediate position disposes the valve member 17 in partial registry with the port 21 to permit the passage of a desired volume or flow of water.

Having thus disclosed the invention, I claim:
1. A faucet assembly comprising a metal faucet body having a cylindrical part provided with a cylindrical chamber, a flat base and a shank provided with an inlet passage offset from the axis of the cylindrical chamber and having an enlarged bore in axial alignment with said passage and opening into the cylindrical chamber through said base and a discharge port, a spring-biased valve seat removably and slidably mounted in said bore with its lower surface directly exposed to the passage of liquid through said bore and provided with a port in axial alignment with said inlet passage but of substantially less cross section than said bore for the passage of liquid from said inlet passage and bore, a cap providing a closure for said cylindrical part, a valve stem in axial alignment with said cylindrical chamber projecting through and rotatably mounted in said cap and provided with a control handle on its outer end for rotating said valve stem, a valve member of relatively hard metal on the inner end of said valve stem within said cylindrical chamber and in axial alignment therewith, said valve member consisting of a circular metal plate conformably fitting within said chamber and having a flat surface in rotating metal to metal contact with said flat base and in contact with said valve seat, said valve seat being urged into sealing contact with the flat surface of said valve member by the pressure of the entering liquid, said valve member having a single port therethrough rotatable into and out of registry with the port in the valve seat with the port of said valve member being offset from the axis of rotation, and a collar above and in axial alignment with said metal plate, said collar being recessed adjacent said valve port and spaced from the walls of the cylindrical chamber thereby forming an annular passage communicating with said discharge port, whereby when the ports of said valve seat and valve member are disposed in registry the liquid entering the inlet passage and the port of said valve seat flows through the port in said valve member, the recess in said collar and into the annular passage about said valve member and exits through the discharge port.

2. A faucet assembly as set forth in claim 1, in which the bore connecting said inlet passage and said cylindrical chamber is larger in cross section than said inlet passage and providing a shoulder for the lower end of the spring biasing one face of the valve seat against the valve member, the upper end of the spring bearing against the other face of the valve seat exposed to the entering liquid to retain the valve seat in its elevated position when liquid pressure is relieved.

3. A faucet assembly as set forth in claim 1, in which the recess in the collar is offset from the axis of said collar and communicates with the port in the valve member, said recess opening radially outwardly into the annular passage at a point opposite the discharge port when the ports in the valve member and the valve seat are in registry.

4. A faucet assembly as set forth in claim 1, in which the valve member includes means to limit rotary movement of the circular metal plate, said means comprising an abutment on the base of said valve body adjacent said discharge port, said metal plate being relieved over a portion of its periphery to provide for a desired arc of rotation with each end of said relieved portion providing a stop adapted to contact said abutment to limit the arc of rotation of said valve member between open and closed positions.

References Cited in the file of this patent
UNITED STATES PATENTS

| | | |
|---|---|---|
| 283,788 | Johnson | Aug. 28, 1883 |
| 914,407 | Gold | Mar. 9, 1909 |
| 2,081,462 | McClure | May 25, 1937 |
| 2,089,848 | Hoferle | Aug. 10, 1937 |
| 2,291,563 | Rotter | July 28, 1942 |
| 2,420,972 | Perri | May 20, 1947 |
| 2,696,219 | Barksdale | Dec. 7, 1954 |
| 2,762,602 | St. Clair | Sept. 11, 1956 |